United States Patent

Hänsel

[11] Patent Number: 6,086,119
[45] Date of Patent: Jul. 11, 2000

[54] DETACHABLE PLUG-IN CONNECTION FOR RECEIVING A TUBULAR PLUG-IN-PART

[75] Inventor: Mathias Hänsel, Rümmingen, Germany

[73] Assignee: A. Raymond & Cie, France

[21] Appl. No.: 09/051,997

[22] PCT Filed: Oct. 24, 1996

[86] PCT No.: PCT/EP96/04614

§ 371 Date: Apr. 22, 1998

§ 102(e) Date: Apr. 22, 1998

[87] PCT Pub. No.: WO97/16672

PCT Pub. Date: May 9, 1997

[30] Foreign Application Priority Data

Nov. 2, 1995 [DE] Germany ............ 195 40 784

[51] Int. Cl.⁷ .................................. F16L 37/12
[52] U.S. Cl. ............... 285/309; 285/319; 285/921
[58] Field of Search .................. 285/305, 308, 285/310, 921, 81, 319, 309

[56] References Cited

U.S. PATENT DOCUMENTS

| | | | |
|---|---|---|---|
| 1,097,798 | 5/1914 | Girod | 285/309 X |
| 2,025,112 | 12/1935 | Laurent | 285/81 X |
| 2,728,895 | 12/1955 | Quackenbush et al. | 285/81 X |
| 4,423,892 | 1/1984 | Bartholomew | 285/319 |
| 5,269,566 | 12/1993 | Do et al. | 285/305 X |
| 5,303,958 | 4/1994 | Hyatt et al. | 285/81 X |
| 5,324,081 | 6/1994 | Umezawa | 285/319 X |
| 5,595,499 | 1/1997 | Zander et al. | 439/352 |
| 5,711,550 | 1/1998 | Brandt | 285/319 X |

FOREIGN PATENT DOCUMENTS 376562 7/1932 United Kingdom ............ 285/309

*Primary Examiner*—Eric K. Nicholson
*Assistant Examiner*—Greg Binda
*Attorney, Agent, or Firm*—Gifford, Krass, Groh, Sprinkle, Anderson & Citkowski, P.C.

[57] ABSTRACT

A detachable, quick connect connector having a retaining spring with jaws for engaging a locking ring of a tube. The connector includes a housing with a chamber for receiving the tube and the retaining spring. The retaining spring has a pair of inwardly directed jaws which are opened by pushing a plate connected by webs to the jaws. When opened, the jaws permit the locking ring to pass through and close to engage the ring when the tube has been fully inserted. A support member projects outwardly from each jaw and is received in a recess formed in the housing wall. The support members have arcuate surfaces to engage a contact surface along the recess to secure the retaining spring axially in the housing. The end faces are beveled outwardly from a radial plane by an angle between 15° and 60° to increase the retaining force of the support members.

5 Claims, 1 Drawing Sheet

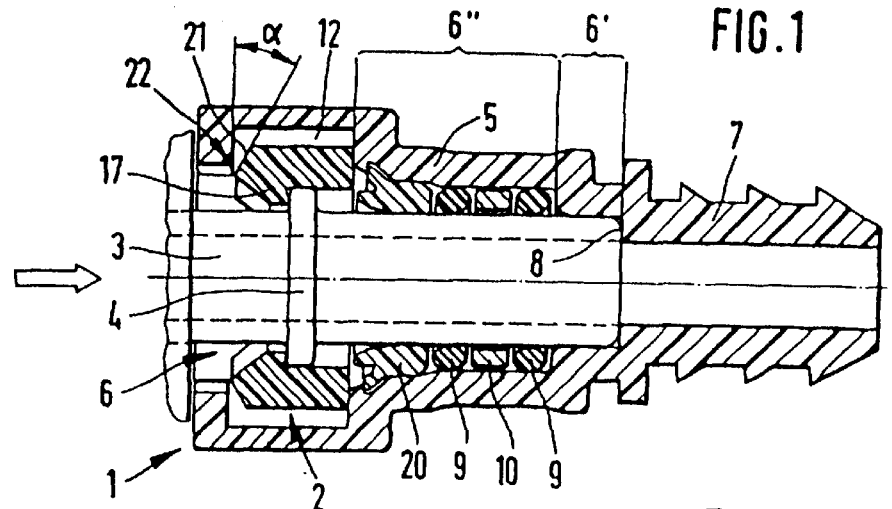
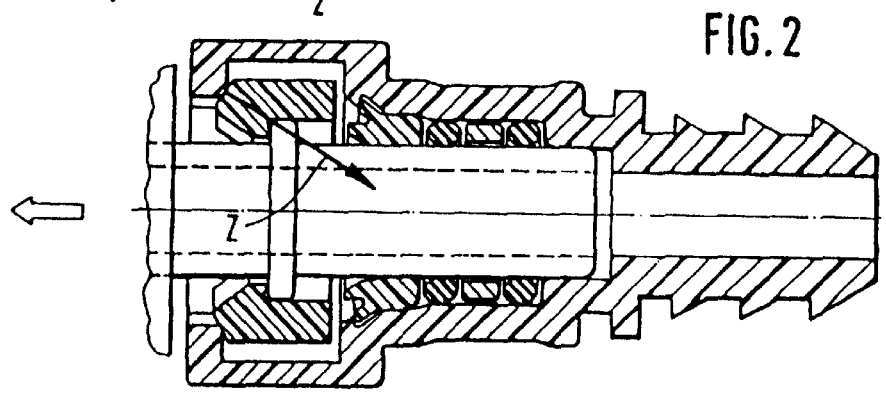
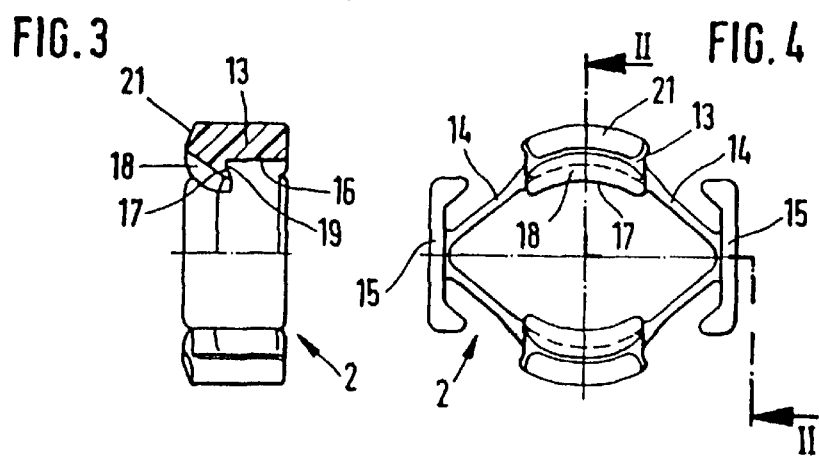
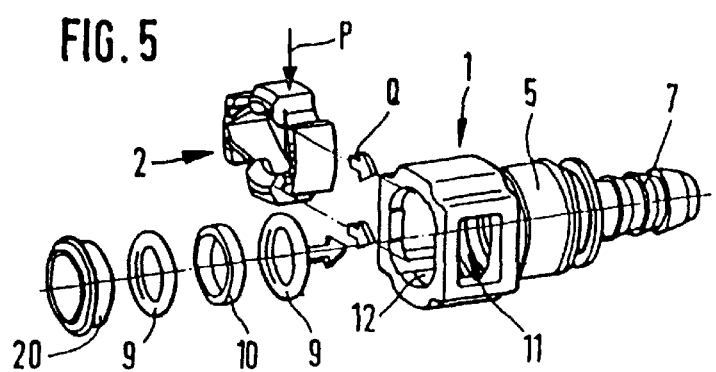

DETACHABLE PLUG-IN CONNECTION FOR RECEIVING A TUBULAR PLUG-IN-PART

BACKGROUND OF THE INVENTION

The invention pertains to a connector for accommodating a tube with a circumferential locking ring. The tube may consist of the end of a stable metal tube, e.g., a metal tube used for fuel lines. However, it may also consist of rigid plastic or another common injection-molded material that can be conventionally connected to a hose or tube.

Such a plug connector is known as disclosed in EP 0,605,801 A1. In this disclosure, the end faces of the support bodies have the shape of a circular arc and are directed radially outward in a radial manner to the axis of the housing. The support bodies abut the inner surface of the recess on the side of the opening with end faces when a tensile force is exerted upon the tube. In the practical application of this connector, it was determined that the thusly generated holding force was not sufficient for ensuring a reliable fuel coupling. If high tensile forces are exerted upon the tube, the support bodies prematurely slide off laterally such that the coupling is separated.

Thus, it is an object of the invention to produce a connector of this type in such a way that the holding forces required for safety can be satisfactorily generated. This objective is attained with the present invention, wherein the angle of the end faces of the support members, extend at an angle to a radial plane of preferably 25° to 45°.

Due to the angle of the end faces according to the invention, a wedge effect is attained on the inner surface of a recess when tensile forces are exerted upon the connector. The higher the tensile forces, the higher the force with which the support members are pressed against the locking ring. Thus, it is possible to more than double the holding force with this arrangement.

According to another feature of the invention, the holding surfaces of the holding edges that adjoin the locking ring may be outwardly inclined in opposition to the insertion direction such that the holding edges abut the locking ring as close to the base as possible.

BRIEF DESCRIPTION OF THE DRAWING

A preferred embodiment of the invention is illustrated in the accompanying figures and described in detail below. The figures show:

FIG. 1 is a longitudinal section through an assembled connector housing after the insertion of a tube, namely in a nonstressed state;

FIG. 2 is the same arrangement as described in FIG. 1 above, however tensile forces are exerted upon the tube;

FIG. 3 is a side view of a retaining spring and a partial section through the upper support member;

FIG. 4 is a front view of the same retaining spring, and

FIG. 5 is an exploded view of the connector housing with the corresponding components before assembly.

DETAILED DESCRIPTION OF THE PREFERRED EMBODIMENTS

The connector shown in the figures consists of a receptacle housing 1 and a retaining spring 2 that is manufactured from a hard-elastic plastic material. The connector serves for receiving a tube 3 provided with a circumferential locking ring 4. This tube 3 may consist of the end of a tube of rigid material or a rigid adapter that can be conventionally connected to the end of a tube of softer material.

The receptacle housing 1 according to FIG. 1 consists of a cylindrical housing wall 5 with a chamber 6 for the plug-in that contains several shoulders. One shoulder forms a limit stop 8 on the end of the chamber 6. A cylindrical connector piece 7 forms an axial extension of the chamber and serves for connection with a not-shown fluid line. The chamber 6 begins with a first region 6', the inside diameter of which corresponds to the outside diameter of the tube 3. A second region 6" has a larger diameter and is arranged adjacent thereto. The wider diameter of the second region is provided for accommodating two ring seals 9, an intermediate ring 10, and a spacer ring 20, the inside diameter of which also corresponds to the outside diameter of the tube 3.

Two diametrically opposed openings 11 (see FIG. 5) are situated in the housing wall 5 within the front insertion region of the receptacle housing 1. Two recesses 12 are provided for inserting and fixing the retaining spring 2 and are arranged transversely to the aforementioned openings 11.

The retaining spring 2 (as shown in FIG. 4) is composed of two support members 13 having a curved outer edge. The support members are connected at their ends by elastic crosspieces 14 that converge in the shape of a V. The connecting points are covered with rectangular pressure plates 15 that are slightly narrower than the opening 11 in the housing.

The support members 13 have opposed curved inner walls 16 adapted to receive the arcuate shaped outside diameter of the locking rings 4. In addition, the support members are provided with two jaw portions 17 that have arcuate shaped edges and are directed radially inwardly. The jaw portions have inclined insertion surfaces 18 on one side and holding surfaces 19 that are radially offset toward the opposite side and engage behind the locking ring 4 of the tube 3 when in the inserted condition. The holding surfaces 19 are preferably slightly inclined toward the outside, i.e., opposite to the insertion direction, such that the jaw portions 17 adjoin the locking ring 4 as close to the base as possible.

The support members 13 are additionally provided with arcuate shaped support surfaces 21 and are held in a direction opposite to the insertion direction by an inner contact edge 22 of the inner wall defining the recess 12. Within the contact region the support surfaces 21 are, viewed in the insertion direction, to be inclined outwardly relative to a radially extending plane by an angle α of 15° to 60°, wherein the angle α is preferably 25° to 45°. Accordingly, the support surfaces 21 as shown in FIG. 2, press in the of the arrow "Z" against the inner contact edge 22 when tensile forces are exerted upon the tube 3,i.e., the retaining spring 2 is braced even tighter against the jaw portions 17.

In the preferred embodiment, the inner contact edge 22 is preferably rounded. However, it may also be provided with an inclined surface, the angle of which approximately corresponds to the angle α. This measure significantly simplifies the sliding motion along the support surface 21.

When inserting the retaining spring 2 into the chamber 6, the support members 13 are initially pressed together in the direction of the arrow "P" as shown in FIG. 5. The retaining spring 2 is then inserted into an opening 11 of the housing wall 5 in the direction of the arrow "Q" and is pressed through the chamber 6. As soon as the support members 13 have passed through the opening 11, they return to their expanded initial state due to the restoring force of the elastic crosspieces 14 and enter into the recesses 12 to such a degree that they are axially supported once they have arrived in the center of the chamber 6.

Sufficient space for allowing the support members 13 to laterally yield during the insertion of the tube 3 needs to remain between the crosspieces 14 and the recess 12. This occurs automatically once the locking ring 4 slides over the insertion surfaces 18 during the insertion of the tube 3, such that the jaw portions 17 are pressed outwardly. As soon as the end of the tube 3 contacts the limit stop 8 of the chamber 6, the support members 13 spring back into their initial state and the jaws 17 are positioned against the rear side of the locking ring 4 against the holding surfaces 19 such that the tube 3 is secured in the connector.

When separating the connector, the pressure plates 15 are pressed together until the jaw portions 17 are spread apart sufficiently far, namely to such a degree that the jaw portions 17 no longer engage behind the locking ring 4. The tube 3 can now be effortlessly pulled out of the receptacle housing 1.

I claim:

1. A connector for detachably receiving a tube having a locking ring, said connector comprising:

a housing having a cylindrical wall defining a chamber for receiving said tube, said housing having an inner wall at one end and a connection portion at an opposite end, said inner wall defining a pair of recesses and opening into said chamber;

a retaining spring mounted in said chamber of said housing, said retaining spring having a pair of inwardly extending jaw portions, each of said jaw portions having an arcuate edge adapted to engage said tube, said retaining spring having a pair of support members extending radially outwardly to be received in said pair of recesses of said housing to position said retaining ring axially within said chamber, each of said support members being integrally formed with one of said jaw portions and having a support surface with an arcuate edge, said support surface spaced radially outwardly from each of said jaw portions, said support surface extending at a predetermined angle in the range of 15° to 60° to a plane extending normally to a longitudinal axis of said housing, said support surface extending at said predetermined angle radially outwardly in a direction towards said connection portion, said support surface engaging an inner portion of said inner wall of said housing to oppose removal of said tube when said tube is inserted into said chamber, said retaining spring having a portion movable radially inwardly to move said edges of said jaw portions radially outwardly to permit said ring of said tube to pass therebetween to remove said tube from said housing.

2. The connector of claim 1, wherein said predetermined angle is in the range of between 25° to 45°.

3. The connector of claim 1, wherein said locking portion of said retaining spring has a holding surface for contacting said locking ring of said tube when said tube is in an inserted position within said chamber, said holding surface being angled in a direction from said longitudinal axis toward said inner portion of said inner wall contacting said support surface of said retaining spring.

4. The connector of claim 1, wherein said inner portion of said inner wall has a contact portion which extends at an angle which corresponds to the predetermined angle of said support surface.

5. The connector of claim 1, wherein said portion of said inner wall has a rounded contact portion rounded for engaging said support surface of said retaining spring.

* * * * *

UNITED STATES PATENT AND TRADEMARK OFFICE
CERTIFICATE OF CORRECTION

PATENT NO. : 6,086,119
DATED : July 11, 2000
INVENTOR(S) : Mathias Hansel

It is certified that error appears in the above-identified patent and that said Letters Patent is hereby corrected as shown below:

Title page,
Foreign Application Priority Data - Replace "195 40 784" with -- 195 40 784.9 --
References Cited - Insert -- 5,374,088  12/1994  Moretti et al.  285/305 --

Column 2,
Line 2 - Delete "for the plug-in"
Line 44 - After "region" insert -- , --
Line 48 - Replace "press in the of the" with -- press in the direction of the --
Line 50 - Replace "3,i.e." with -- 3, i.e. --

Signed and Sealed this

Eighteenth Day of September, 2001

Attest:

NICHOLAS P. GODICI
Attesting Officer
Acting Director of the United States Patent and Trademark Office